US008791169B2

(12) United States Patent
Heo et al.

(10) Patent No.: US 8,791,169 B2
(45) Date of Patent: Jul. 29, 2014

(54) FLUORENE-BASED RESIN POLYMER AND PHOTO-SENSITIVE RESIN COMPOSITION COMPRISING THE SAME

(75) Inventors: Yoon Hee Heo, Daejeon (KR); Kwang Han Park, Daejeon (KR); Han Soo Kim, Daejeon (KR); Changho Cho, Anseong-si (KR); Sunhwa Kim, Daejeon (KR); Won Jin Chung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 183 days.

(21) Appl. No.: 13/360,057

(22) Filed: Jan. 27, 2012

(65) Prior Publication Data

US 2012/0196949 A1     Aug. 2, 2012

(30) Foreign Application Priority Data

Jan. 27, 2011   (KR) ........................ 10-2011-0008330

(51) Int. Cl.
   B29C 71/04      (2006.01)
   C08F 2/46       (2006.01)
   C08G 61/04      (2006.01)
(52) U.S. Cl.
   USPC ........................................ 522/3; 522/1; 520/1
(58) Field of Classification Search
   USPC ............................................. 522/3, 1; 520/1
   See application file for complete search history.

(56) References Cited

U.S. PATENT DOCUMENTS

2009/0202750 A1    8/2009   Nawa et al.

FOREIGN PATENT DOCUMENTS

| JP | 2005-037516 | * | 2/2005 |
| JP | 2007-045925 | * | 2/2007 |
| JP | 2009-249604 | * | 10/2009 |
| WO | 2006/137257 A1 | | 12/2006 |
| WO | 2007/049665 A1 | | 5/2007 |
| WO | 2007049665 A1 | | 5/2007 |

OTHER PUBLICATIONS

Office Action issued in Japanese Patent Application No. 2012-015242 on Feb. 26, 2013 along with English translation, 6 pages.
Japanese Office Action issued in corresponding Japanese Patent Application No. 2012-015242 on Jul. 30, 2013 along with English translation, 5 pages.

* cited by examiner

*Primary Examiner* — Ling Choi
*Assistant Examiner* — Jessica E Whiteley
(74) *Attorney, Agent, or Firm* — Rothwell, Figg, Ernst & Manbeck, P.C.

(57) ABSTRACT

The present invention relates to a fluorene-based resin polymer, and a photosensitive resin composition including the same, and the fluorene-based resin polymer according to the exemplary embodiment of the present invention has a high molecular weight, a low acid value, and excellent developing property, adhesive property and stability.

15 Claims, No Drawings

FLUORENE-BASED RESIN POLYMER AND PHOTO-SENSITIVE RESIN COMPOSITION COMPRISING THE SAME

CROSS-REFERENCE TO RELATED APPLICATIONS

This application claims priority to and the benefit of Korean Patent Application No. 10-2011-0008330 filed in the Korean Intellectual Property Office on Jan. 27, 2011, the entire contents of which are incorporated herein by reference.

TECHNICAL FIELD

The present invention relates to a fluorene-based resin polymer, a photosensitive resin composition including the fluorene-based resin polymer, and a photosensitive material manufactured by using the same.

BACKGROUND ART

A photosensitive resin composition may be used to form a pattern by forming a coat by applying the photosensitive resin composition on a substrate, performing exposure on a predetermined portion of the coat by using a photomask by light irradiation, and removing a non-exposure portion by developing. Since a photosensitive resin composition may be polymerized and cured by irradiating light, the photosensitive resin composition is used for photocurable ink, a photosensitive printed board, various photoresists, a color filter photoresist for LCD, a photoresist for resin black matrixes, or a transparent photosensitive material.

A photosensitive resin composition generally includes a binder resin, a polymerizable compound having an ethylene unsaturated bond, a photopolymerization initiator, and a solvent.

In a photosensitive resin composition, a binder resin enables coating by providing adhesive strength to a substrate, enables formation of fine patterns by being dissolved in an alkali developing solution, and prevents the pattern from being broken during a post-treatment process by providing strength to the obtained pattern. Further, the binder resin largely affects heat resistance and chemical resistance.

SUMMARY OF THE INVENTION

The present inventors have repeatedly studied a fluorene-based resin polymer having excellent adhesive property to a substrate and good developing property, and a photosensitive resin composition including the same, thereby accomplishing the present invention.

An exemplary embodiment of the present invention provides a fluorene-based resin polymer including a repeating unit represented by the following Formula 1.

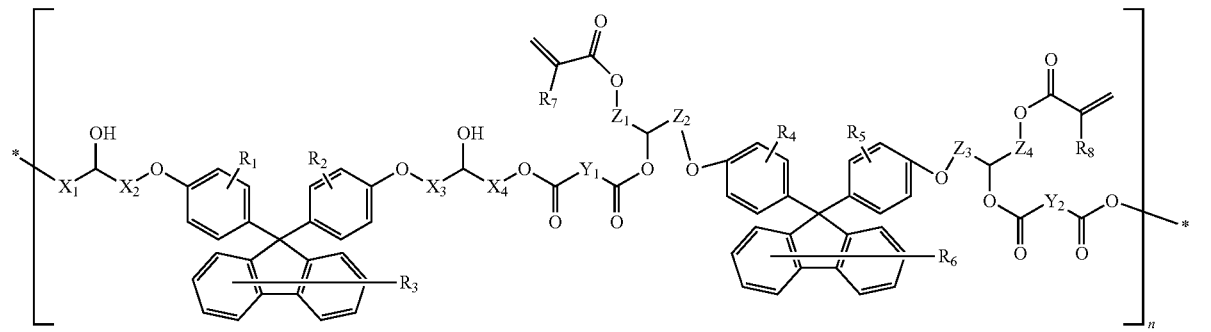

[Formula 1]

wherein, $X_1, X_2, X_3, X_4, Z_1, Z_2, Z_3$ and $Z_4$ are the same as or different from each other, and each independently selected from the group consisting of an alkylene group having 1 to 3 carbon atoms, an ethylene oxide group and a propylene oxide group, $Y_1$ and $Y_2$ are the same as or different from each other, and each independently selected from the group consisting of an alkylene group having 1 to 5 carbon atoms, a cycloalkylene group having 3 to 10 carbon atoms, a cycloalkenylene group having 3 to 10 carbon atoms and an arylene group having 6 to 10 carbon atoms, $R_1, R_2, R_3, R_4, R_5, R_6, R_7$ and $R_8$ are the same as or different from each other, and each independently hydrogen, or an alkyl group having 1 to 3 carbon atoms, and n is an integer of 1 to 5,000.

Another exemplary embodiment of the present invention provides a photosensitive resin composition including the fluorene-based resin polymer including a repeating unit represented by Formula 1, a polymerizable compound including an ethylene unsaturated bond, a photoinitiator, and a solvent.

Yet another exemplary embodiment of the present invention provides a photosensitive material manufactured by using the photosensitive resin composition.

The fluorene-based resin polymer according to the exemplary embodiment of the present invention has a high molecular weight and a low acid value.

The fluorene-based resin polymer according to the exemplary embodiment of the present invention has excellent developing property.

The fluorene-based resin polymer according to the exemplary embodiment of the present invention has excellent adhesive property.

The fluorene-based resin polymer according to the exemplary embodiment of the present invention has excellent stability.

DETAILED DESCRIPTION

Hereinafter, an exemplary embodiment of the present invention will be described in more detail.

A fluorene-based resin polymer according to the exemplary embodiment of the present invention includes a repeating unit that is represented by Formula 1.

In the fluorene-based resin polymer according to the exemplary embodiment of the present invention, substituent groups of Formula 1 will be described in more detail below.

The alkylene group may be a straight chain or branched chain, and for example, there may be a methylene group, an ethylene group, a propylene group, and an isopropylene group, but the alkylene group is not limited thereto.

The cycloalkylene group may be a monocycle or condensated cycle, and for example, there may be a cyclohexylene group, but the cycloalkylene group is not limited thereto.

The cycloalkenylene group may be a monocycle or condensated cycle, and for example, there may be a cyclohexenylene group, but the cycloalkenylene group is not limited thereto.

The arylene group may be a monocycle or condensated cycle, and for example, there may be a phenylene group, and a naphthalene group, but the arylene group is not limited thereto.

The alkyl group is, for example, a methyl group, an ethyl group, a propyl group or an isopropyl group.

Formula 1 may be more specifically represented by the following Formula 2.

[Formula 2]

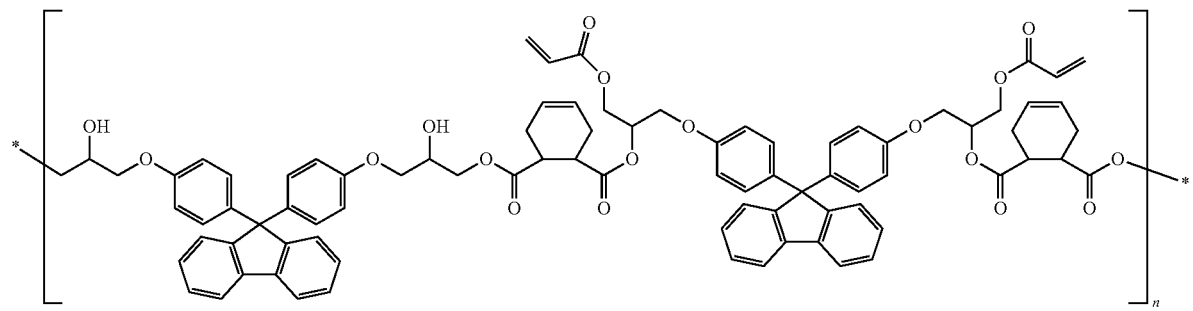

wherein n is an integer of 1 to 5,000.

A method of manufacturing the fluorene-based resin polymer according to the exemplary embodiment of the present invention may include:

a first step of synthesizing a fluorene-based compound including an ethylene unsaturated group like the following Reaction Equation 1;

a second step of synthesizing a fluorene-based diacid compound by reacting a product of the first step and a compound including an acid group; and a third step of synthesizing a fluorene-based resin polymer by reacting a product of the second step and the fluorene-based compound including an epoxy group.

In detail, the method of manufacturing the fluorene-based resin polymer may provide a compound represented by the following Formula 3, which is a medium product generated through the synthesis steps of the first step and the second step like the following Reaction Equation 1.

(First step)
[Reaction Equation 1]
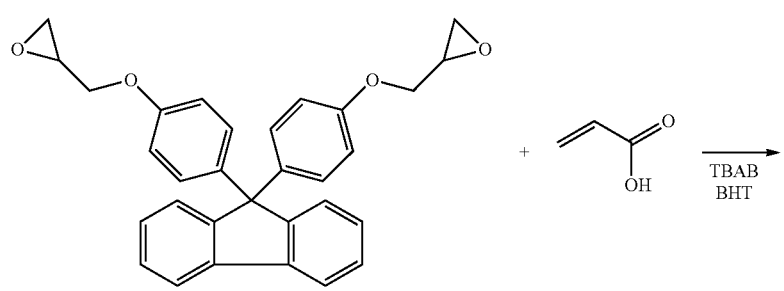
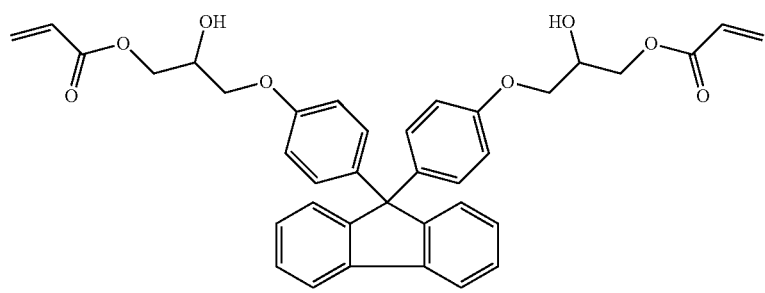
(Second step)
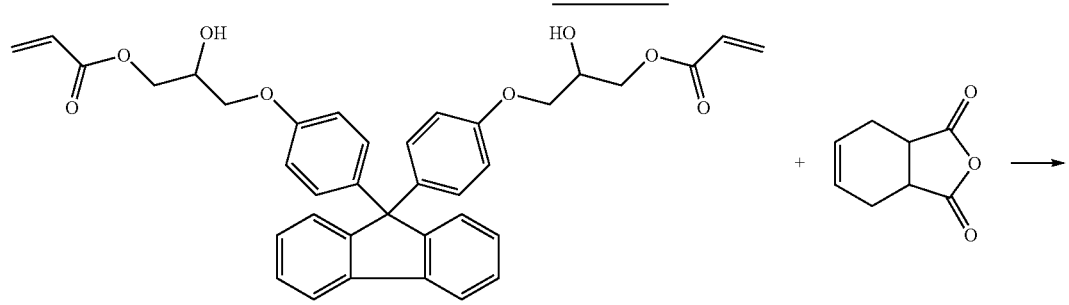
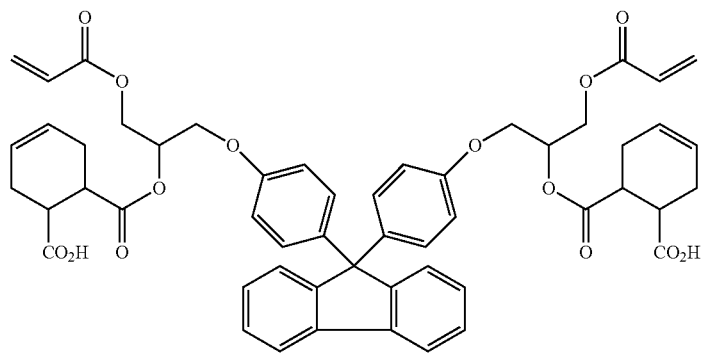
[화학식 3]

In the third step, the fluorene-based resin polymer according to the exemplary embodiment of the present invention may be manufactured by reacting the compound represented by Formula 3 and the compound represented by the following Formula 4, but this is not limited.

[Formula 4]

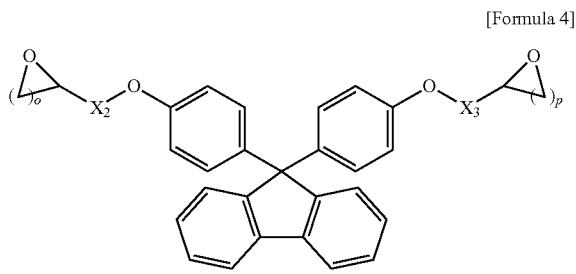

wherein, $X_2$ and $X_3$ are the same as or different from each other, and each independently an alkylene group having 1 to 3 carbon atoms, an ethylene oxide group or a propylene oxide group, and o and p are an integer of 1 to 3.

In this case, in the second step, $Y_1$ and $Y_2$ of Formula 1 may be determined according to the compound reacted with the product generated through the first step.

Like the exemplary embodiment of the method of manufacturing the fluorene-based resin polymer, in the second step, in the case that the compound reacted with the product generated through the first step is phthalic anhydride, $Y_1$ and $Y_2$ of Formula 1 are each determined as a cyclohexenyl group.

In the third step, in the compound represented by Formula 4, $X_1$ and $X_4$ of Formula 1 may be determined according to o and p of the following Formula 5 and Formula 6 respectively bonded to $X_2$ and $X_3$.

[Formula 5]

[Formula 6]

For example, in the case where in Formula 5 and 6, o and p are each 1, $X_1$ and $X_4$ of Formula 1 are each determined as a methylene group, such that Formula 4 may be represented by the following Formula 7.

[Formula 7]

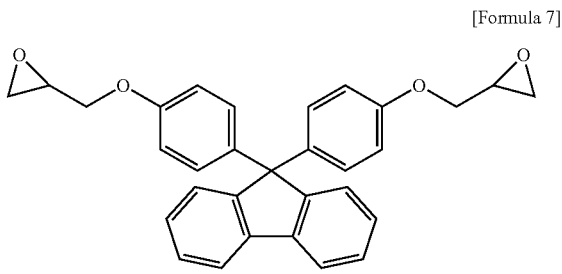 [SMILES: c1ccc2c(c1)-c1ccccc1C2(c1ccc(OCC2CO2)cc1)c1ccc(OCC2CO2)cc1]

Among a binder resin that can be used in a photosensitive resin composition, a use of a cardo-based binder resin including a fluorene group is considered. This is because the cardo-based binder resin including the fluorene group has good sensitivity and merits of excellent heat resistance and chemical resistance.

In the case that a fluorene-based resin polymer is manufactured by reacting a diol compound and acid dianhydride, the fluorene-based resin polymer has a high molecular weight, such that the fluorene-based resin polymer is useful for a negative type photosensitive resin composition.

However, if the fluorene-based resin polymer is manufactured by the aforementioned method, generation of an acid group is increased as the diol group and the acid dianhydride group meet and react with each other.

Accordingly, in the case that the molecular weight of the fluorene-based resin polymer is increased, the acid value of the fluorene-based resin polymer is excessively high, such that a problem occurs in terms of compatibility with the other compound in the negative type photosensitive resin composition or developing property.

Accordingly, the present inventors manufactured a fluorene-based resin polymer by reacting the epoxy compound including the fluorene group represented by Formula 4 and the compound represented by Formula 3 like the third step in order to improve the aforementioned problems.

The fluorene-based resin polymer manufactured by the aforementioned method does not generate the acid group through the reaction of the third step.

Therefore, a novel fluorene-based resin polymer having a high molecular weight but an acid value that is not high may be manufactured by the method of manufacturing the fluorene-based resin polymer according to the exemplary embodiment of the present invention.

In the case of a polymer manufactured by a polycondensation reaction, a ratio of two monomers participating in the reaction may be almost 1:1 in order to increase the molecular weight. Further, the molecular weight may be increased by finding an optimum condition such as a catalyst and a temperature so that two monomers are reacted by 100% and providing the condition.

However, in the fluorene-based resin polymer, a ratio of acid dianhydride to the diol compound is 1:0.8. The reason is because if the reaction is excessively performed, the molecular weight and the acid value are largely increased, such that an increase of the acid value to 120 or more is not preferable for the photosensitive composition. Further, since acid dianhydride has poor solubility to the reaction solvent, for example, PGMEA, if the ratio is 0.8 or more, the reaction is not performed any more and a white solid remains as it is.

On the other hand, since the width of the increase in acid value of the fluorene-based resin polymer according to the exemplary embodiment of the present invention is narrow even though the molecular weight is increased, the molecular weight may be increased to the desired degree. Since the solubility of the compounds represented by Formulae 3 and 4 with respect to the solvent is excellent, the binder resin having a high molecular weight may be obtained by increasing the reaction ratio of two compounds.

In a fluorene-based resin polymer, a portion of acid dianhydride used in the reaction remains in a small amount after the reaction is finished, stability of the negative type photosensitive resin composition including the polymer may be largely decreased.

On the other hand, since in the fluorene-based resin polymer according to the exemplary embodiment of the present invention, an anhydride group is not used in the reaction, the fluorene-based resin polymer obtained after the reaction is stable, and stability of the negative type photosensitive resin composition including the polymer is excellent.

If a fluorene-based resin polymer is used in the negative type photosensitive resin composition, when the fluorene-based resin polymer has a high acid value in comparison with a low molecular weight, for example, the acid value of about 120 with respect to the molecular weight of about 4,000 to 7,000 g/mol, there are disadvantages in that it is not easy to control the developing property, and a lower part of the pattern is removed during developing.

On the other hand, when the fluorene-based resin polymer according to the exemplary embodiment of the present invention is used in the negative type photosensitive resin composition, since the fluorene-based resin polymer according to the exemplary embodiment of the present invention has a low acid value and a higher molecular weight as compared to the known fluorene-based resin, it is possible to ensure an appropriate level of developing property.

The fluorene-based resin polymer according to the exemplary embodiment of the present invention may improve a removal phenomenon of the lower part of the pattern that may occur during the developing process after exposure.

The removal phenomenon of the lower part of the pattern means a phenomenon that the lower part of the pattern is removed by the developing solution, and the upper part of the pattern is sunk after a post-bake step, such that the final pattern has a step shape.

Since the fluorene-based resin polymer according to the exemplary embodiment of the present invention improves the developing property while maintaining the adhesive property to the substrate that is an advantage of the fluorene-based compound, the developing adhesive property is excellent. Herein, the developing adhesive property means a property that the pattern adheres to the substrate during the developing process. It is known that a fluorene-based compound adheres well to the substrate during the developing process as compared to other compounds. However, even though the polymer made of the fluorene-based compound adheres well to the substrate, the polymer is disadvantageous in that the lower part of the pattern is removed in a large area due to the high acid value.

As described above, the fluorene-based resin polymer according to the exemplary embodiment of the present invention is a polymer that has excellent adhesive property to the substrate, the high molecular weight, the low acid value, and improved developing property and stability.

In detailed, the weight average molecular weight of the fluorene-based resin polymer according to the present invention may be 1,000 to 50,000, but the weight average molecular weight is not limited thereto.

The acid value of the fluorene-based resin polymer according to the present invention may specifically be 30 to 150 KOH mg/g, but the acid value is not limited thereto.

The photosensitive resin composition according to the exemplary embodiment of the present invention includes the fluorene-based resin polymer including a repeating unit represented by Formula 1, a polymerizable compound including an ethylene unsaturated bond, a photoinitiator, and a solvent.

In the photosensitive resin composition according to the exemplary embodiment of the present invention, the content of the fluorene-based resin polymer including the repeating unit represented by Formula 1 is specifically 1 to 20 wt % on the basis of the total weight of the photosensitive resin composition, but is not limited thereto.

In the photosensitive resin composition according to the exemplary embodiment of the present invention, the polymerizable compound including the ethylene unsaturated bond may include one or more compounds selected from pentaerythritol tri(meth)acrylate, pentaerythritol tetra(meth)acrylate, ethylene glycol di(meth)acrylate and polyethylene glycol di(meth)acrylate, but is not limited thereto.

The content of the polymerizable compound including the ethylene unsaturated bond is specifically 1 to 30 wt % on the basis of the total weight of the photosensitive resin composition, but is not limited thereto.

In the photosensitive resin composition according to the exemplary embodiment of the present invention, the photoinitiator may include one or more compounds selected from a triazine-based compound such as 2,4-trichloromethyl-(4'-methoxyphenyl)-6-triazine, 2,4-trichloromethyl-(4'-methoxystyryl)-6-triazine, and 2,4-trichloromethyl-(fipronil)-6-triazine; an acetophenone-based compound such as 1-hydroxycyclohexyl phenylketone, and 4-(2-hydroxyethoxy)-phenyl-(2-hydroxy)propyl ketone; and a benzophenone-based compound such as benzophenone, and 2,4,6-trimethylaminobenzophenone, but is not limited thereto.

The content of the photoinitiator is specifically 0.1 to 5 wt % on the basis of the total weight of the photosensitive resin composition, but is not limited thereto.

In the photosensitive resin composition according to the exemplary embodiment of the present invention, the solvent may include one or more compounds selected from methyl ethyl ketone, propylene glycol diethyl ether, propylene glycol methyl ether acetate, 3-methoxybutyl acetate, and dipropylene glycol monomethyl ether, but is not limited thereto.

The content of the solvent is specifically 45 to 95 wt % on the basis of the total weight of the photosensitive resin composition, but is not limited thereto.

The photosensitive resin composition according to the exemplary embodiment of the present invention may further include one or more selected from the group consisting of a colorant, a curing accelerator, a thermal polymerization inhibitor, a surfactant, a photosensitizer, a plasticizer, an adhesion promoter, a filler and an adhesive preparation according to the purpose.

As the colorant, one or more pigments, dyes, or mixtures thereof may be used. In detail, as a black pigment, carbon black, graphite, and metal oxide such as titanium black may be used.

As examples of the carbon black, there are Cisto 5HIISAF-HS, Cisto KH, Cisto 3HHAF-HS, Cisto NH, Cisto 3M, Cisto 300HAF-LS, Cisto 116HMMAF-HS, Cisto 116MAF, Cisto FMFEF-HS, Cisto SOFEF, Cisto VGPF, Cisto SVHSRF-HS, and Cisto SSRF (Donghae Carbon, Co., Ltd.); Diagram black II, Diagram black N339, Diagram black SH, Diagram black H, Diagram LH, Diagram HA, Diagram SF, Diagram N550M, Diagram M, Diagram E, Diagram G, Diagram R, Diagram N760M, Diagram LR, #2700, #2600, #2400, #2350, #2300, #2200, #1000, #980, #900, MCF88, #52, #50, #47, #45, #45L, #25, #CF9, #95, #3030, #3050, MA7, MA77, MA8, MA11, MA100, MA40, OIL7B, OIL9B, OIL11B, OIL30B, and OIL31B (Mitsubishi Chemical, Co., Ltd.); PRINTEX-U, PRINTEX-V, PRINTEX-140U, PRINTEX-140V, PRINTEX-95, PRINTEX-85, PRINTEX-75, PRINTEX-55, PRINTEX-45, PRINTEX-300, PRINTEX-35, PRINTEX-25, PRINTEX-200, PRINTEX-40, PRINTEX-30, PRINTEX-3, PRINTEX-A, SPECIAL BLACK-550, SPECIAL BLACK-350, SPECIAL BLACK-250, SPECIAL BLACK-100, and LAMP BLACK-101 (Degussa, Co., Ltd.); RAVEN-1100ULTRA, RAVEN-1080ULTRA, RAVEN-1060ULTRA, RAVEN-1040, RAVEN-1035, RAVEN-1020, RAVEN-1000, RAVEN-890H, RAVEN-890, RAVEN-880ULTRA, RAVEN-860ULTRA, RAVEN-850, RAVEN-820, RAVEN-790ULTRA, RAVEN-780ULTRA, RAVEN-760ULTRA, RAVEN-520, RAVEN-500, RAVEN-460, RAVEN-450, RAVEN-430ULTRA, RAVEN-420, RAVEN-410, RAVEN-2500ULTRA, RAVEN-2000, RAVEN-1500, RAVEN-1255, RAVEN-1250, RAVEN-1200, RAVEN-1190ULTRA, and RAVEN-1170 (Columbia Carbon, Co., Ltd.), or mixtures thereof.

As examples of the colorant exhibiting a color, there are carmine 6B (C.I. 12490), phthalocyanine green (C.I. 74260), phthalocyanine blue (C.I. 74160), perylene black (BASF K0084. K0086), cyanine black, linol yellow (C.I. 21090), linol yellow GRO(C.I. 21090), benzidine yellow 4T-564D, victoria pure blue (C.I. 42595), C.I. PIGMENT RED 3, 23, 97, 108, 122, 139, 140, 141, 142, 143, 144, 149, 166, 168, 175, 177, 180, 185, 189, 190, 192, 202, 214, 215, 220, 221, 224, 230, 235, 242, 254, 255, 260, 262, 264, and 272; C.I. PIGMENT GREEN 7, 36; C.I. PIGMENT blue 15:1, 15:3, 15:4, 15:6, 16, 22, 28, 36, 60, and 64; C.I. PIGMENT yellow 13, 14, 35, 53, 83, 93, 95, 110, 120, 138, 139, 150, 151, 154, 175, 180, 181, 185, 194, and 213; and C.I. PIGMENT VIOLET 15, 19, 23, 29, 32, and 37, and in addition to this, and white pigments and fluorescent pigments may be used. As the phthalocyanine-based complex compound used as the pigment, a material in which zinc is used as the central metal other than copper may be used.

The curing accelerator, for example, may include one or more selected from the group consisting of 2-mercaptobenzoimidazole, 2-mercaptobenzothiazole, 2-mercaptobenzoxazole, 2,5-dimercapto-1,3,4-thiadiazole, 2-mercapto-4,6-dimethylaminopyrydine, pentaerythritol tetrakis(3-mercaptopropionate), pentaerythritol tris(3-mercaptopropionate), pentaerythritol tetrakis(2-mercaptoacetate), pentaerythritol tris(2-mercaptoacetate), trimethylolpropane tris(2-mercaptoacetate), trimethylolpropane tris(3-mercaptopropionate), trimethylolethane tris(2-mercaptoacetate), and trimethylolethane tris(3-mercaptopropionate), but is not limited thereto, and may include matters that are generally known in the art.

The thermal polymerization inhibitor may include, for example, one or more selected from the group consisting of p-anisole, hydroquinone, pyrocatechol, t-butyl catechol, N-nitrosophenylhydroxyamine ammonium salts, N-nitrosophenylhydroxyamine aluminum salts and phenothiazine, but is not limited thereto and matters that are generally known in the art may be included.

As the surfactant, photosensitizer, plasticizer, adhesive promoter, and filler, all compounds that can be included in a photosensitive resin composition may be used.

The content of the colorant is specifically 1 to 20 wt % on the basis of the total weight of the photosensitive resin composition, and the contents of the other additives are each independently specifically 0.01 to 5 weight on the basis of the total weight of the photosensitive resin composition, but are not limited thereto.

Meanwhile, the photosensitive resin composition according to the exemplary embodiment of the present invention is used in a roll coater, a curtain coater, a spin coater, a slot die coater, and various printings and precipitations, and may be applied on a support of metal, paper, glass, and plastic substrates. Further, after being applied on the support such as the film, the composition may be transferred on the other support, or the composition may be applied on a first support, transferred on a blanket, and transferred on a second support, and the application method is not particularly limited.

As a light source for curing the photosensitive resin composition according to the exemplary embodiment of the present invention, for example, there are a mercury vapor arc, a carbon arc, and a Xe arc emitting light having a wavelength of 250 to 450 nm, but the light source is not limited thereto.

Further, the exemplary embodiment of the present invention provides a photosensitive material manufactured by using the photosensitive resin composition.

The photosensitive resin composition according to the exemplary embodiment of the present invention is specifically used in a pigment dispersion type photosensitive material for manufacturing a TFT LCD color filter, a photosensitive material for forming a black matrix of a TFT LCD or organic light emitting diode, a photosensitive material for forming an overcoat layer, and a column spacer photosensitive material.

The photosensitive resin composition according to the exemplary embodiment of the present invention may be used in manufacturing a photosensitive material for photocurable paint, photocurable ink, photocurable adhesive, a printed board, and a printed circuit board, and other transparent photosensitive materials and PDPs, and the purpose thereof is not particularly limited.

A better understanding of the present invention may be obtained in light of the following Examples which are set forth to illustrate, but are not to be construed to limit the present invention.

EXAMPLE

Synthetic Example 1

Synthesis of the Fluorene-Based Compound 305 g of 9,9-bisphenolfluorenediglycidylether, 95 g of the acrylic acid, 3.2 g of tetrabutyl ammonium bromide, and 0.22 g of the thermal polymerization inhibitor MEHQ were agitated with 400 g of the propylene glycol methyl ether acetate as a solvent, and the reactor was heated to 110° C. while air was blown into the reactor. The fluorene-based compound was obtained by finishing the reaction after 24 hours (solid 50.10%, and molecular weight 606 g/mol).

Synthetic Example 2

Synthesis of the Fluorene-Based Diacid Compound 133 g of fluorene-based compound manufactured in Synthetic Example 1 and 33 g of 1,2,3,6-tetrahydro phthalic anhydride were agitated with 130 g of the propylene glycol methyl ether acetate as a solvent, and the reactor was heated to 110° C. while air was blown into the reactor. The fluorene-based diacid compound was obtained by finishing the reaction after 12 hours (solid 38.85%, acid value 130 KOH mg/g, and molecular weight 910 g/mol).

Synthetic Example 3

Synthesis of the Fluorene-Based Resin Polymer 153 g of fluorene-based diacid compound synthesized in Synthetic Example 2 and 14 g of 9,9-bisphenolfluorenediglycidylether were agitated with 65 g of the propylene glycol methyl ether acetate as a solvent, and the reactor was heated to 120° C. while air was blown into the reactor. The fluorene-based resin polymer was obtained by finishing the reaction after 16 hours (solid 30.03%, acid value 60 KOH mg/g, and molecular weight 4,200 g/mol).

Synthetic Example 4

Synthesis of the Fluorene-Based Diacid Compound 133 g of fluorene-based compound synthesized in Synthetic Example 1 and 22 g of succinic anhydride were agitated with 120 g of the propylene glycol methyl ether acetate as a solvent, and the reactor was heated to 110° C. while air was blown into the reactor. The fluorene-based diacid compound was obtained by finishing the reaction after 12 hours (solid 39.50%, acid value 135 KOH mg/g, and molecular weight 807 g/mol).

Synthetic Example 5

Synthesis of the Fluorene-Based Resin Polymer 136 g of fluorene-based diacid compound synthesized in Synthetic Example 4 and 14 g of 9,9-bisphenolfluorenediglycidylether were agitated with 50 g of the propylene glycol methyl ether acetate as a solvent, and the reactor was heated to 120° C. while air was blown into the reactor. The fluorene-based resin polymer was obtained by finishing the reaction after 16 hours (solid 30.54%, acid value 67 KOH mg/g, and molecular weight 4,000 g/mol).

Comparative Synthetic Example 1

Synthesis of the Fluorene-Based Resin Polymer 180 g of fluorene-based compound synthesized in Synthetic Example 1, 22 g of biphenyl tetracarboxylic dianhydride, 11 g of 1,2,3,6-tetrahydro phthalic anhydride and 0.28 g of tetrabutyl ammonium bromide were agitated with 33 g of the propylene glycol methyl ether acetate as a solvent, and the reactor was heated to 115° C. while air was blown into the reactor. The fluorene-based resin polymer was obtained by finishing the reaction after 5 hours (solid 49.30%, acid value 100 KOH mg/g, and molecular weight 3,800 g/mol).

Example 1

25 parts by weight of the fluorene-based resin polymer synthesized in Synthetic Example 3, 100 parts by weight of the carbon black dispersion solution, 5 parts by weight of CGI-242 that was the photoinitiator, 35 parts by weight of dipentaerythritol hexaacrylate, and 80 parts by weight of propyleneglycol monomethylether acetate that was the solvent were mixed and agitated for about 3 hours, and the photosensitive resin composition was prepared.

Example 2

25 parts by weight of the fluorene-based resin polymer synthesized in Synthetic Example 5 and the same compositions as those used in Example 1 were mixed and agitated for about 3 hours, and the photosensitive resin composition was prepared.

Comparative Example 1

25 parts by weight of the fluorene-based resin polymer synthesized in Comparative Synthetic Example 1 and the same compositions as those used in Example 1 were mixed and agitated for about 3 hours, and the photosensitive resin composition was prepared.

Experimental Example 1

The photosensitive resin composition solutions manufactured in Examples 1 to 2 and Comparative Example 1 were applied on the glass substrate by spin coating, the coat having the thickness of 1.2 µm was formed by performing preheating treatment at 100° C. for 140 sec, and the photomask was covered on the coat and exposed with energy of 40 mJ/cm². The exposed substrate was developed by a spray manner using the 0.043% KOH aqueous solution at 25° C. for 80 sec, washed with pure water, and dried, such that the black matrix pattern was formed through the drying process in the convection oven at 230° C. for 20 min.

The straight property and the sensitivity were confirmed by observing the states of the patterns obtained in the Experimental Example by using the optical microscope, and the results are described in the following Table 1.

TABLE 1

|  | Straight property | Size of remaining minimum pattern |
|---|---|---|
| Example 1 | ○ | 8.6 µm |
| Example 2 | ○ | 8.2 µm |
| Comparative Example 1 | Δ | 9.9 µm |

In Table 1, the straight property was described on the basis of the observation result by the optical microscope, and the result was classified into the case that the straight property was good (○), the case that the straight property was average (Δ) and the case that the straight property was poor (X).

The sensitivity and the developing adhesive property were confirmed by describing the size of the minimum pattern remaining after the exposure and developing processes in Table 1.

Experimental Example 2

After the photosensitive resin composition solutions manufactured in Examples 1 to 2 and the Comparative Example 1 were stored in the oven at 45° C. for 3 days, the viscosity was measured, such that the case that the change rate was within 5% was evaluated as good stability (○), the case that the change rate was 5 to 10% was evaluated as average stability (Δ), and the case that the change rate was more than 10% was evaluated as poor stability (X), which are described in the following Table 2.

TABLE 2

|  | Stability at 45° C. |
|---|---|
| Example 1 | ○ |
| Example 2 | ○ |
| Comparative Example 3 | X |

As confirmed in the results of Tables 1 and 2, the fluorene-based resin polymer according to the exemplary embodiment of the present invention has excellent sensitivity and the low removal phenomenon of the lower part of the pattern for the same developing time, such that developing adhesive property, straight property and stability are excellent, thus being useful for a negative type photosensitive resin composition.

What is claimed is:

1. A fluorene-based resin polymer, comprising:
a repeating unit represented by the following Formula 1:

[Formula 1]

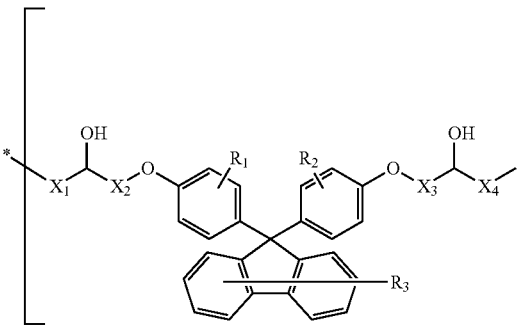

wherein,
$X_1$, $X_2$, $X_3$, $X_4$, $Z_1$, $Z_2$, $Z_3$ and $Z_4$ are the same as or different from each other, and each independently selected from the group consisting of an alkylene group having 1 to 3 carbon atoms, an ethylene oxide group and a propylene oxide group, $Y_1$ and $Y_2$ are the same as or different from each other, and each independently selected from the group consisting of an alkylene group having 1 to 5 carbon atoms, a cycloalkylene group having 3 to 10 carbon atoms, a cycloalkenylene group having 3 to 10 carbon atoms and an arylene group having 6 to 10 carbon atoms, $R_1$, $R_2$, $R_3$, $R_4$, $R_5$, $R_6$, $R_7$ and $R_8$ are the same as or different from each other, and each independently hydrogen, or an alkyl group having 1 to 3 carbon atoms, and n is an integer of 1 to 5,000.

2. The fluorene-based resin polymer according to claim 1, wherein the Formula 1 is represented by the following Formula 2:

[Formula 2]

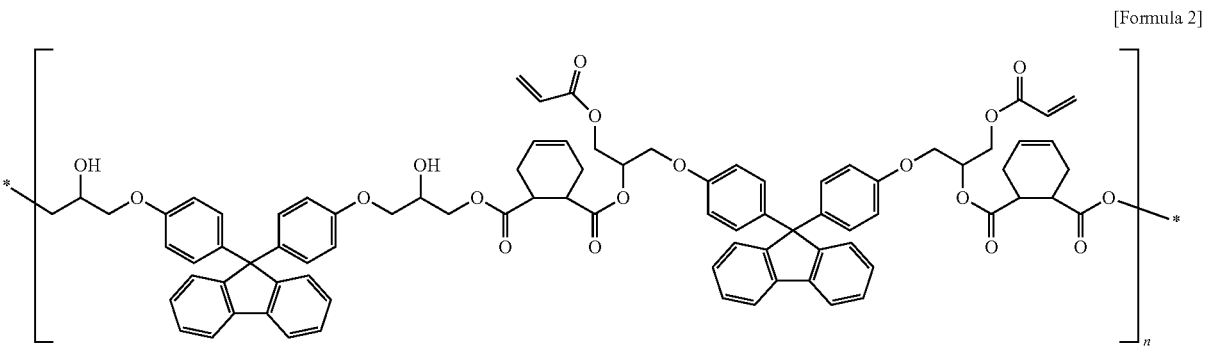

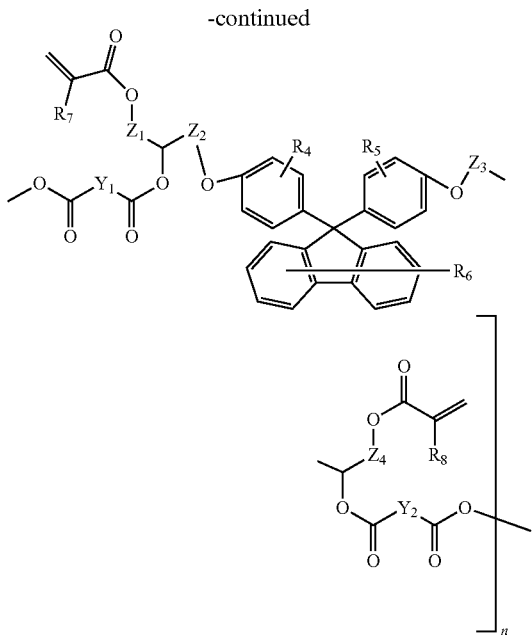

-continued wherein n is an integer of 1 to 5,000.

3. The fluorene-based resin polymer according to claim 1, wherein a weight average molecular weight of the fluorene-based resin polymer is 1,000 to 50,000.

4. The fluorene-based resin polymer according to claim 1, wherein an acid value of the fluorene-based resin polymer is 30 to 150 KOH mg/g.

5. A photosensitive resin composition, comprising:
the fluorene-based resin polymer according to claim 1,
a polymerizable compound including an ethylene unsaturated bond,
a photoinitiator, and
a solvent.

6. The photosensitive resin composition according to claim 5, wherein a content of the fluorene-based resin polymer is 1 to 20 wt % on the basis of a total weight of the photosensitive resin composition.

7. The photosensitive resin composition according to claim 5, wherein the polymerizable compound including the ethylene unsaturated bond includes one or more selected from the group consisting of pentaerythritol tri(meth)acrylate, pentaerythritol tetra(meth)acrylate, ethylene glycol di(meth)acrylate and polyethylene glycol di(meth)acrylate.

8. The photosensitive resin composition according to claim 5, wherein a content of the polymerizable compound including the ethylene unsaturated bond is 1 to 30 wt % on the basis of a total weight of the photosensitive resin composition.

9. The photosensitive resin composition according to claim 5, wherein the photoinitiator includes one or more selected from the group consisting of a triazine-based compound, an acetophenone-based compound and a benzophenone-based compound.

10. The photosensitive resin composition according to claim 5, wherein a content of the photoinitiator is 0.1 to 5 wt % on the basis of a total weight of the photosensitive resin composition.

11. The photosensitive resin composition according to claim 5, wherein the solvent includes one or more selected from the group consisting of methyl ethyl ketone, propylene glycol diethyl ether, propylene glycol methyl ether acetate, 3-methoxybutyl acetate and dipropylene glycol monomethyl ether.

12. The photosensitive resin composition according to claim 5, wherein a content of the solvent is 45 to 95 wt % on the basis of a total weight of the photosensitive resin composition.

13. The photosensitive resin composition according to claim 5, wherein the photosensitive resin composition further includes one or more selected from the group consisting of a colorant, a curing accelerator, a thermal polymerization inhibitor, a surfactant, a photosensitizer, a plasticizer, an adhesion promotor, a filler and an adhesive.

14. A photosensitive material manufactured by using the photosensitive resin composition of claim 5.

15. The photosensitive material according to claim 14, wherein the photosensitive material is selected from the group consisting of a pigment dispersion type photosensitive material for manufacturing a color filter, a photosensitive material for forming a black matrix, a photosensitive material for forming an overcoat layer, a column spacer photosensitive material, and a photosensitive material for a printed circuit board.

* * * * *